United States Patent Office 3,136,389
Patented June 9, 1964

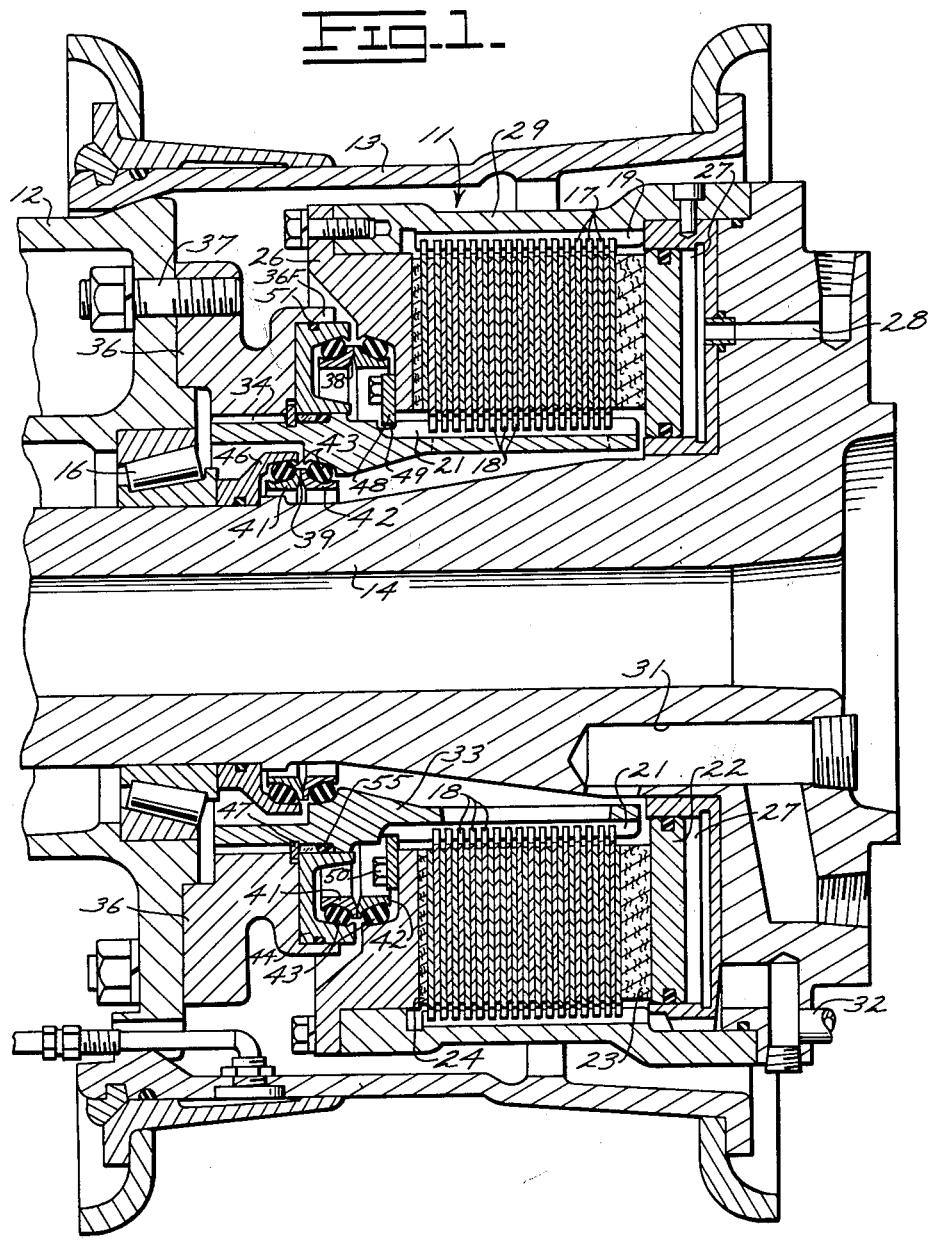

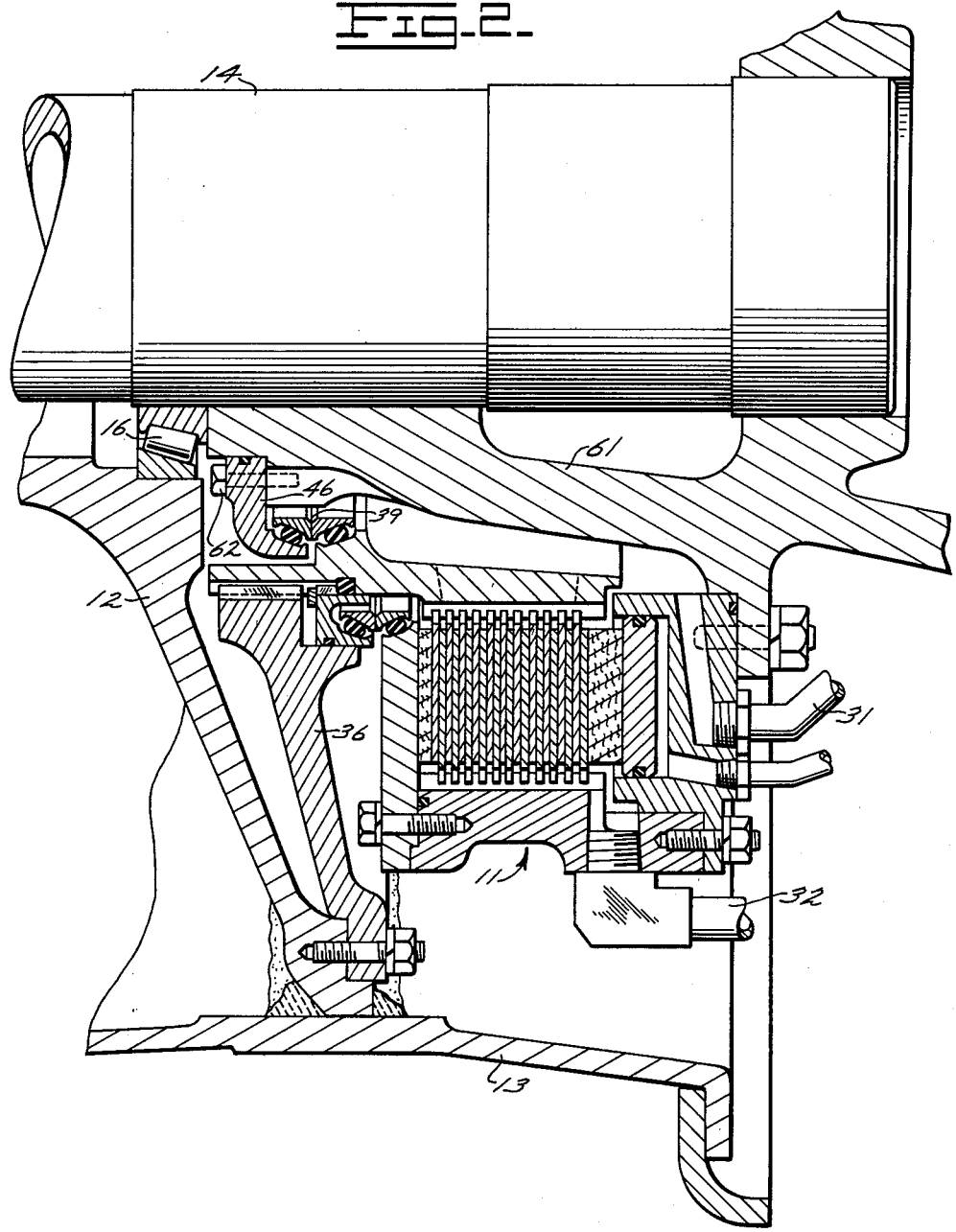

3,136,389
SEALING MEANS FOR LIQUID COOLED FRICTION COUPLES
Curtis F. Cummins, Decatur, Ill., assignor to Caterpillar Tractor Co., Peoria, Ill., a corporation of California
Filed Dec. 31, 1962, Ser. No. 248,607
2 Claims. (Cl. 188—72)

The present invention relates to friction couples of the kind in which torque is transmitted between two relatively rotatable members by an interleaved stack of friction discs and particularly to such friction couples as used for a brake for a wheeled vehicle.

In brakes of this kind, the interleaved stack of discs have faces which are movable into frictional contact with one another, and the discs are associated alternately throughout the stack with a stationary axle member and a rotatable wheel member. Considerable heat is generated when the discs are moved into frictional contact, and it is conventional to mount the discs within a sealed chamber and to circulate coolant, generally oil, through the chamber and interleaved stack of discs to carry away the heat. Seals are necessary to make the chamber fluid-tight and to prevent the entrance of foreign matter into the chamber. Problems arise in the positioning of such seals during initial assembly of the brake, wheel and axle and also in retaining the seals in sealing position during subsequent disassembly and reassembly of the wheel and axle. It is a primary object of the present invention to so construct a brake of this kind as to facilitate assembly and disassembly and minimize problems of oil leakage from the chamber and entrance of foreign matter into the chamber.

In accordance with the present invention, a coupling member is used for connecting the rotatable wheel with the set of discs associated with the wheel. This coupling member has a first set of splines which extend into the sealed chamber and engage with the rotatable wheel discs. It has a second set of splines outside the chamber which are engaged with complementary splines on a wheel member. First seal means are located on the coupling member between the two sets of splines to co-act with a wall of the chamber, and second seal means are located on the coupling member between the two sets of splines to co-act with the axle member and prevent loss of coolant from the chamber and entrance of foreign matter into the chamber. The seal between the chamber wall and the coupling member may preferably comprise two ring members held in position by a snap ring seated in a groove in the coupling member. This construction is effective to retain the ring members in sealing engagement during assembly and disassembly of the wheel member along the inter-engaged splines on the coupling member and constitutes a further specific object of the present invention.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of appended claims.

In the drawings:

FIG. 1 is an elevation view in section of a brake constructed in accordance with one embodiment of the present invention; and FIG. 2 is an elevation view in section of a brake constructed in accordance with another embodiment of the present invention.

In FIG. 1, a brake constructed in accordance with one embodiment of the present invention is indicated generally by the reference numeral 11. In general construction and mode of operation the brake 11 is similar to that disclosed in pending U.S. application Serial No. 19,110, filed March 31, 1960, now Patent No. 3,072,220, issued January 8, 1963, and assigned to the same assignee as the present application.

The brake 11 is shown disposed between a rotatable wheel 12 and wheel rim 13 and a non-rotatable axle housing 14. The wheel 12 is mounted for rotation on bearings, one of which is illustrated at 16 and another of which, not shown, is disposed outwardly, to the left as viewed in FIG. 1, of the axle housing 14.

The brake 11 comprises a stack of interleaved friction discs having faces movable into frictional contact and associated alternately throughout the stack with the rotatable wheel 12 and non-rotatable axle housing 14. Thus, discs 17 are non-rotatable and are associated with the stationary axle housing 14, and discs 18 are rotatable with the wheel 12. The discs 17 and 18 are free to move axially along respective splines 19 and 21 and into frictional engagement with one another. An annular piston ring 22, acting through a ring 23 of resilient material and against a similar ring 24 of resilient material on a back plate 26, supplies the axial force for so compressing the stack into torque transmitting, frictional engagement. Piston ring 22 is, in turn, pneumatically actuated by air pressure admitted to a chamber 27 by passageways 28. Piston 22 and end plate 26 define the side walls, and axle housing 14 and an outer wall 29 provide the other walls for a fluid chamber surrounding the stack of discs. Cooling oil is circulated through the chamber thus defined from an inlet 31 to an outlet 32.

In accordance with the present invention, a coupling member 33 is used to connect the discs 18 for rotation with the wheel 12. The coupling member 33 includes a first set of splines 21 which extend into the coolant chamber and engage with the discs 18 as above described. The coupling member 33 includes a second set of splines 34 which are outside the chamber and which engage with complementary splines on a wheel member 36 attached to the wheel 12 by studs 37. Seals means are located between the sets of splines 21 and 34 to provide seals 38 and 39 between the chamber wall 26 and the axle housing 14. Each of the seal means may preferably include metal ring members 41 and 42 pressed into sealing engagement about their outer peripheries by rubber tori 43. An annular positioning member 44 provides the inclined surface for exerting the desired compression on the torus 43 associated with ring 41 of the seal 38. Another annular positioning member 46 similarly provides the inclined surface for exerting the desired force on ring 41 of seal 39. A snap ring 47 seated within a groove formed on the coupling member 33 is effective to retain the positioning member 44 in a fixed axial position on the coupling member 33 during any disassembly of the wheel 12 from the axle housing 14 by axial disengagement of the inter-engaged splines 34 of the coupling member 33 and complementary splines of the wheel member 36.

To prevent axial movement of the coupling member 33 during removal of the wheel from the axle housing locking means including segments 48 are attached to the end plate 26 by capscrews 50 and engage an undercut 49 formed in the coupling member 33. The segments abut the end edges of the splines 21 to prevent axial movement of the coupling member 33.

The wheel member 36 includes a flange 36F which overlaps the outer periphery of the positioning member 44 and forms a seal therewith through an O-ring 51 disposed within a circular groove in the outer periphery of the positioning member. Another O-ring 55 in a similar groove on the inner periphery provides a seal about the periphery. For assembly purposes, the length of the splines 34 is greater than the axial extent of the flange 36F so that the splines of the two parts engage before the flange 36F begins to overlap the O-ring 51.

In accordance with the present invention, the manner in which the splines are formed on the coupling member 33 permits the seal 38 and O-ring 55 to be preassembled with the brake 11 before the wheel 12 is mounted on the axle housing 14. This is a distinct advantage in that it eliminates the need to make a difficult blind assembly of this seal. The manner of retaining this seal in assembled position by use of the snap ring 47 is an additional important feature of the present invention in that this construction positively insures against the entrance of any foreign matter into the brake through this seal during disassembly and assembly of the wheel 12 on the axle housing 14.

Another form of the present invention is illustrated in FIG. 2. In over-all arrangement and mode of operation, the construction shown in FIG. 2 is generally similar to that shown and described in FIG. 1, and like reference numerals are used to designate like parts. The construction shown in FIG. 2 is especially adapted for use as the wheel mounting for the large wheels of wheel tractors. In this case, the wheel assembly includes an axle member 61, which may be a casting, pressed tightly to the axle housing 14. In the assembly of the large tractor wheels, it is necessary to move the wheel in place with the help of a mechanical lift or crane. In such cases, it may be preferable to have a more positive positioning of the seal 39 prior to assembly of the wheel on the axle than would be provided with the construction illustrated in FIG. 1. In accordance with the present invention, this is achieved by attaching the positioning member 46 to the axle member 61 by bolts 62.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a brake for a wheeled vehicle of the kind in which a braking force is transmitted from an axle member to a wheel member through an interleaved stack of friction discs which have faces movable into frictional contact and which are associated alternatively throughout the stack with the stationary axle member and the rotatable wheel member and wherein the friction discs are disposed within a sealed chamber through which coolant is circulated to carry away heat produced by frictional engagement of the discs, a coupling member having a first set of splines extending into the sealed chamber and engaged with the rotatable discs associated with the wheel member and having a second set of splines outside the chamber engaged with complementary splines on the wheel member, first seal means on the coupling member between the two sets of splines co-acting with a chamber wall and second seal means on the coupling member between the two sets of splines co-acting with the axle member for preventing loss of coolant from the chamber and entrance of foreign matter into the chamber.

2. In a brake as defined in claim 1, two ring members affording the seal between the coupling member and the chamber wall, a positioning member for holding the ring members in sealing engagement, and a snap ring seated in the coupling member and engaged with the positioning member for retaining the ring members in sealing engagement during assembly and disassembly of the wheel member along the inter-engaged splines on the coupling member.

References Cited in the file of this patent

UNITED STATES PATENTS

| | | |
|---|---|---|
| 2,890,769 | Hause | June 16, 1959 |
| 3,072,220 | Bernson et al. | Jan. 8, 1963 |
| 3,081,842 | Zindler et al. | Mar. 19, 1963 |